United States Patent
Hwang et al.

(10) Patent No.: US 10,454,313 B2
(45) Date of Patent: Oct. 22, 2019

(54) WIRELESS POWER RECEIVER

(71) Applicant: MAPS, INC., Yongin-si (KR)

(72) Inventors: Jong Tae Hwang, Seoul (KR); Hyun Ick Shin, Seoul (KR); Sang O Jeon, Suwon-si (KR); Dae Ho Kim, Seoul (KR); Hui Yong Chung, Seongnam-si (KR); Joon Rhee, Seoul (KR)

(73) Assignee: MAPS, Inc., Yongin-si (KR)

( * ) Notice: Subject to any disclaimer, the term of this patent is extended or adjusted under 35 U.S.C. 154(b) by 197 days.

(21) Appl. No.: 15/558,705

(22) PCT Filed: Mar. 15, 2016

(86) PCT No.: PCT/KR2016/002562
§ 371 (c)(1),
(2) Date: Sep. 15, 2017

(87) PCT Pub. No.: WO2016/153208
PCT Pub. Date: Sep. 29, 2016

(65) Prior Publication Data
US 2018/0115193 A1   Apr. 26, 2018

(30) Foreign Application Priority Data
Mar. 20, 2015   (KR) .................. 10-2015-0039177

(51) Int. Cl.
*H02J 50/12*   (2016.01)
*H02M 7/06*   (2006.01)

(52) U.S. Cl.
CPC .............. *H02J 50/12* (2016.02); *H02M 7/06* (2013.01)

(58) Field of Classification Search
CPC .................................. H02J 50/10; H02J 50/12
See application file for complete search history.

(56) References Cited

U.S. PATENT DOCUMENTS

| | | | |
|---|---|---|---|
| 8,374,545 B2 | 2/2013 | Menegoli et al. | |
| 8,947,041 B2 | 2/2015 | Cook et al. | |
| 9,369,058 B2 | 6/2016 | Boys et al. | |
| 2011/0234012 A1* | 9/2011 | Yi | H02J 50/12 307/104 |
| 2013/0049482 A1 | 2/2013 | Rofe et al. | |
| 2013/0334895 A1 | 12/2013 | Yamamoto | |

(Continued)

FOREIGN PATENT DOCUMENTS

| | | |
|---|---|---|
| JP | 2013-240265 A | 11/2013 |
| KR | 10-2012-0073236 A | 7/2012 |

(Continued)

OTHER PUBLICATIONS

International Search Report dated May 30, 2016, in corresponding International Application No. PCT/KR2016/002562 (3 pages in English, 4 pages in Korean).

*Primary Examiner* — Fritz M Fleming
(74) *Attorney, Agent, or Firm* — NSIP Law

(57) ABSTRACT

A wireless power receiver is disclosed. The wireless power receiver according to an embodiment of the present invention comprises: a resonator for receiving wireless power; a rectifier for converting alternating current power received from the resonator to direct current power and supplying output power to a load; and a control unit for adjusting a resonant frequency of the resonator to directly control the output power of the rectifier supplied to the load.

8 Claims, 11 Drawing Sheets

(56) References Cited

U.S. PATENT DOCUMENTS

2014/0152117 A1* 6/2014 Sankar .................... H02J 50/12
                                                    307/104
2017/0070159 A1  3/2017 Boys et al.

FOREIGN PATENT DOCUMENTS

| KR | 10-2013-0094356 A | 8/2013 |
| KR | 10-2013-0139239 A | 12/2013 |
| WO | WO 2013/006068 A1 | 1/2013 |
| WO | WO 2014/173962 A1 | 10/2014 |

* cited by examiner

WIRELESS POWER RECEIVER

CROSS REFERENCE TO RELATED APPLICATION(S)

This application is a U.S. national stage application of International Application No. PCT/KR2016/002562 filed on Mar. 15, 2016, which claims the benefit under 35 USC 119(a) and 365(b) of Korean Patent Application No. 10-2015-0039177 filed on Mar. 20, 2015, in the Korean Intellectual Property Office.

TECHNICAL FIELD

The present invention relates to a power transmission/reception technique, and more particularly, to a wireless power reception technique.

BACKGROUND ART

A wireless power transmission system is composed of a power transmitting unit (PTU) for transmitting power in a wireless manner and a power receiving unit (PRU) for receiving power in a wireless manner A PRU receives power by using a resonator including an inductor L and a capacitor C. In this case, an alternating current (AC) having the same frequency as power transmitted by the PTU flows as the power of the resonator. Generally, a final output signal is generated in the form of a stable DC signal and supplied to a load, and thus there is a need for a rectifier. The rectifier converts an AC signal into a direct current (DC) signal that is not regulated. The rectifier converts the signal into a precise DC voltage signal by using a power converter and supplies the DC voltage signal to a load. A PRU has a 2-stage structure regardless of type of a converter used, and power transmission efficiency of the receiving unit is determined by multiplying efficiency of the rectifier and efficiency of the power converter. Accordingly, it is difficult to acquire high efficiency when the power converter has a multi-stage structure.

DETAILED DESCRIPTION OF THE INVENTION

Technical Problem

According to an embodiment, a wireless power receiving unit (PRU) capable of increasing power transmission efficiency by generating stable output power by only using a rectifier and a resonator without a separate power converter is proposed.

Technical Solution

A wireless power receiving unit (PRU) according to an embodiment includes a resonator configured to receive wireless power, a rectifier configured to convert alternating current (AC) power received from the resonator into direct current (DC) power and provide output power to a load, and a control unit configured to adjust a resonance frequency of the resonator to directly control the output power of the rectifier provided to the load.

The resonator according to an embodiment may include an inductor, a first capacitor, and a second capacitor connected to the inductor and the first capacitor to set the resonance frequency of the resonator on the target frequency, and the control unit may include a first switch connected to the second capacitor of the resonator and a ground and configured to control the output power of the rectifier by using a first control voltage. In this case, the second capacitor may be connected in series to the first capacitor and the inductor of the resonator and a rectifier capacitor to increase the resonance frequency of the resonator. The control unit may apply a predetermined threshold value or greater as the first control voltage to turn on the first switch and increase the output power of the rectifier, or may apply a predetermined threshold value or less as the first control voltage to turn off the first switch and decrease the output power of the rectifier.

The resonator may include an inductor, a first capacitor, and a third capacitor connected in parallel to the inductor, the first capacitor, and a rectifier capacitor to decrease the resonance frequency of the resonator. In this case, the control unit may include a second switch connected between the third capacitor of the resonator and a ground and configured to control the output power of the rectifier by using a second control voltage.

The resonator according to an embodiment may include an inductor, a first capacitor, a second capacitor connected in series to the inductor, the first capacitor, and a rectifier capacitor to increase the resonance frequency of the resonator, and a third capacitor connected in parallel to the inductor, the first capacitor, and the rectifier capacitor to decrease the resonance frequency of the resonator, and the control unit may include a first switch connected between the second capacitor of the resonator and a ground and configured to control the output power of the rectifier by using a first control voltage, and a second switch connected between the third capacitor of the resonator and the ground and configured to control the output power of the rectifier by using a second control voltage.

The control unit according to an embodiment may turn on the first switch by using the first control voltage and turn off the second switch by using the second control voltage to increase the output power of the rectifier, or may turn off the first switch by using the first control voltage and turn off the second switch by using the second control voltage to increase the resonance frequency and decrease the output power of the rectifier. When the output power of the rectifier is high even though the first switch and the second switch are turned off to decrease the output power, the control unit according to an embodiment may turn on the first switch by using the first control voltage and turn on the second switch by using the second control voltage to decrease the resonance frequency and further decrease the output power of the rectifier.

The rectifier according to an embodiment may include a first rectifier configured to receive a first output signal of the resonator and a second rectifier configured to receive a second output signal of the resonator.

Advantageous Effects of the Invention

According to an embodiment, it is possible to increase power transmission efficiency by generating stable output power by only using a rectifier and a resonator without a separate power converter.

It is also possible to reduce costs of a wireless power transmission system and decrease an overall size of the wireless power transmission system.

MODE OF THE INVENTION

Hereinafter, embodiments of the present invention will be described in detail with reference to the accompanying drawings. In the following description, when a detailed description of a relevant known function or configuration is determined to unnecessarily obscure the gist of the present invention, the detailed description will be omitted. Also, terms used herein are defined in consideration of the functions of the present invention and may be changed depending on a user, the intent of an operator, or a custom. Accordingly, the terms should be defined on the basis of the following overall description of this specification.

Figure 1:
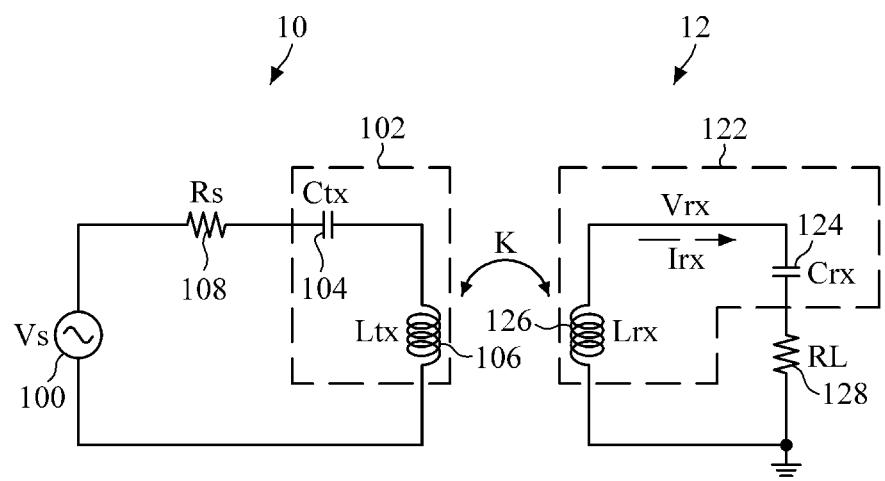
FIG. 1 is an equivalent circuit diagram of a wireless power transmission system.

FIG. 1 is an equivalent circuit diagram of a wireless power transmission system.

Referring to FIG. 1, the wireless power transmission system includes a power transmitting unit (PTU) 10 and a power receiving unit (PRU) 12.

The PTU 10, which transmits energy in a wireless manner, drives a PTU resonator 102 via a high-frequency AC power source Vs 100. The PTU resonator 102 includes a capacitor Ctx 104 and an inductor Ltx 106. The inductor Ltx 106 has an impedance equivalent to that of an antenna of the PTU 10. In order to easily transmit energy supplied by the power source Vs 100 to the PRU 12 through the antenna, resonance frequencies of the capacitor Ctx 104 and the inductor Ltx 106 are generally synchronized with a frequency of the power source Vs 100. A resistor Rs 108 of FIG. 1 is an equivalent resistor of an output impedance of the power source Vs 100 and a series resistance component of the PTU resonator 102.

The PRU 12 includes a PRU resonator 122 including an inductor Lrx 126, which is a reception antenna, and a capacitor Crx 124 for resonance. Generally, by synchronizing a resonance frequency of the inductor Lrx 126 and the capacitor Crx 124 with the frequency of the power source Vs 100, optimal energy reception is possible. The resistor RL 128 of FIG. 1 is an equivalent resistor of a load for transferring power. In FIG. 1, K is a coupling coefficient between the inductor Ltx 106 of the PTU 10 and the inductor Lrx 126 of the PRU 12, and ranges from 0 to 1. When the coupling coefficient is 1, energy of the inductor Ltx 106 of the PTU 10 is maximally transferred to the inductor Lrx 126 of the PRU 12.

Figure 2:
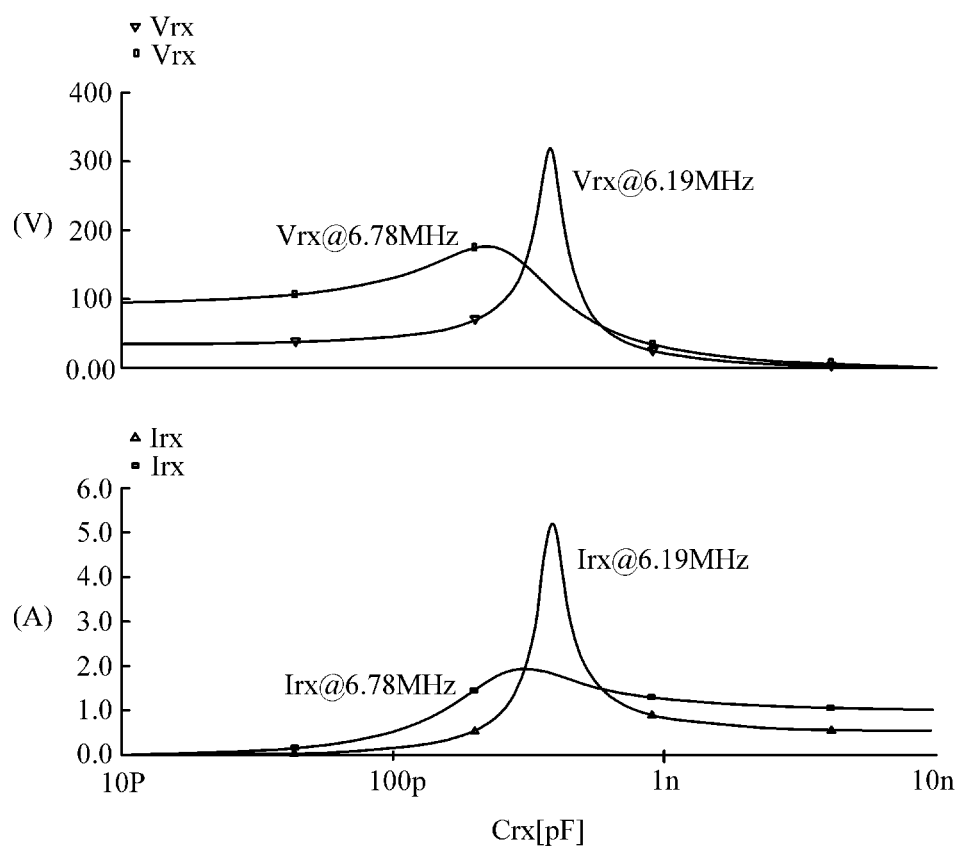
FIG. 2 is a voltage and current waveform chart of a power receiving unit (PRU) resonator at a resonance frequency according to a variation in capacitance of a capacitor Crx in the PRU.

FIG. 2 is a voltage and current waveform chart of a PRU resonator at a resonance frequency according to a variation in capacitance of a capacitor Crx in the PRU.

Referring to FIGS. 1 and 2, since the resonance frequency is changed by capacitance of the capacitor Crx 124 of the PRU 12 being adjusted in the wireless transmission system of FIG. 1, received power is changed. In order to check variations in a voltage Vrx and current Irx of the PRU resonator 122, RL is set to 0, and the capacitance of the capacitor Crx 124 is changed. Through a simulation experiment, the frequency of the power source Vs 100 was set to be 6.78 MHz, and inductance of the inductor Lrx 126 was set to be 1.8 uH. Then, the capacitance of the capacitor Crx 124 was changed to be in a range from 10 pF to 10 nF. A result of performing the simulation experiment after resonance frequencies of the capacitor Ctx 104 and the inductor Ltx 106 of the PTU 10 were set to be 6.78 MHz is as shown in FIG. 2. When the capacitance of the capacitor Crx 124 was small, that is, when the resonance frequency of the PRU resonator 122 was increased over 6.78 MHz, it can be seen that the current Irx of the PRU resonator 122 rapidly decreased. On the other hand, since the impedance of the capacitor Crx 124 increased, the voltage Vrx of the PRU resonator 122 did not decrease significantly. When the resonance frequency was decreased by the capacitance of the capacitor Crx 124 being increased, the voltage of the PRU resonator 122 decreased rapidly, but the current Irx of the PRU resonator 122 did not decrease significantly. Such a phenomenon is affected by characteristics of the PTU resonator 102. It can be seen through FIG. 2 that the characteristics changed when the resonance frequency of the PRU resonator 122 was changed from 6.78 MHz to 6.19 MHz. Still, however, the current Irx of the PRU resonator 122 decreased rapidly as the resonance frequency of the PRU increased, and the voltage Vrx of the PRU resonator 122 decreased rapidly as the resonance frequency of the PRU decreased.

Figure 3:
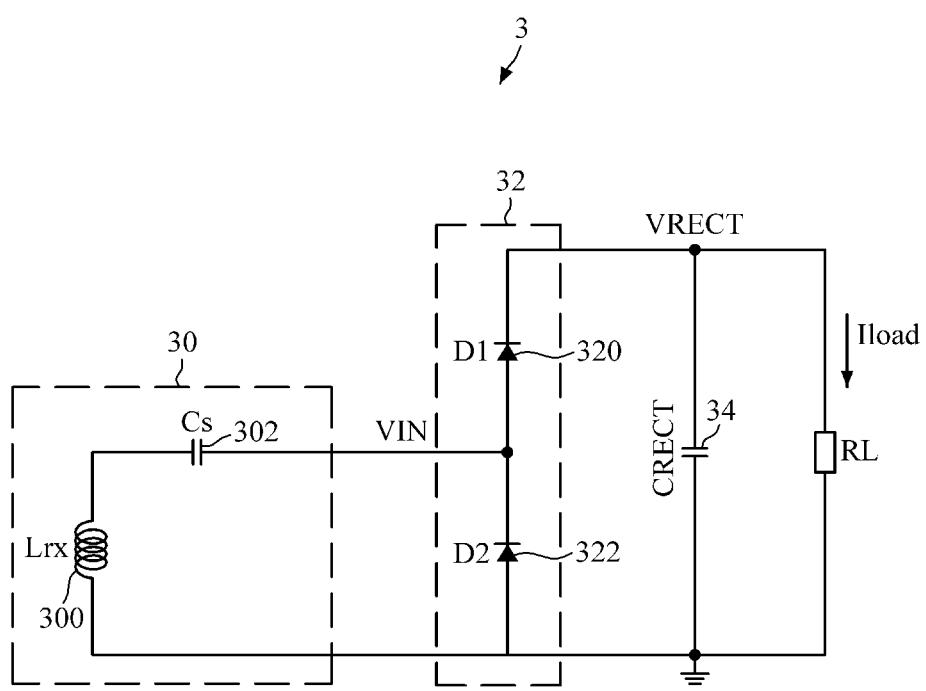
FIG. 3 is a circuit diagram of a PRU composed of a resonator and a rectifier.

FIG. 3 is a circuit diagram of a PRU composed of a resonator and a rectifier.

Referring to FIG. 3, a PRU 3 has a resonator 30 and a rectifier 32 connected to each other. The resonator 30 includes an inductor Lrx 300 and a first capacitor Cs 302, and the rectifier 32 includes diodes D1 320 and D2 322. The rectifier 32 performs a rectification function of converting received alternating current (AC) power into direct current (DC) power. According to an embodiment of the present invention, for convenience of description, it is assumed that power, voltage, and current are conceptually the same because power is proportional to voltage or current. Power received from the inductor Lrx 300 is in the form of an AC. However, since a load requires a DC voltage, AC power is converted into DC power by using the rectifier 32 composed of the diode D1 320 and D2 322 and a rectifier capacitor CRECT 34. In this case, a resonance frequency fr of the resonator 30 is expressed as shown in FIG. 1. Generally, the frequency of the resonator 30 is synchronized with a frequency of a driving voltage Vs of the PRU 3.

$$fr = \frac{1}{2\pi\sqrt{LrxCs}}. \qquad \text{[Equation 1]}$$

Figure 4:
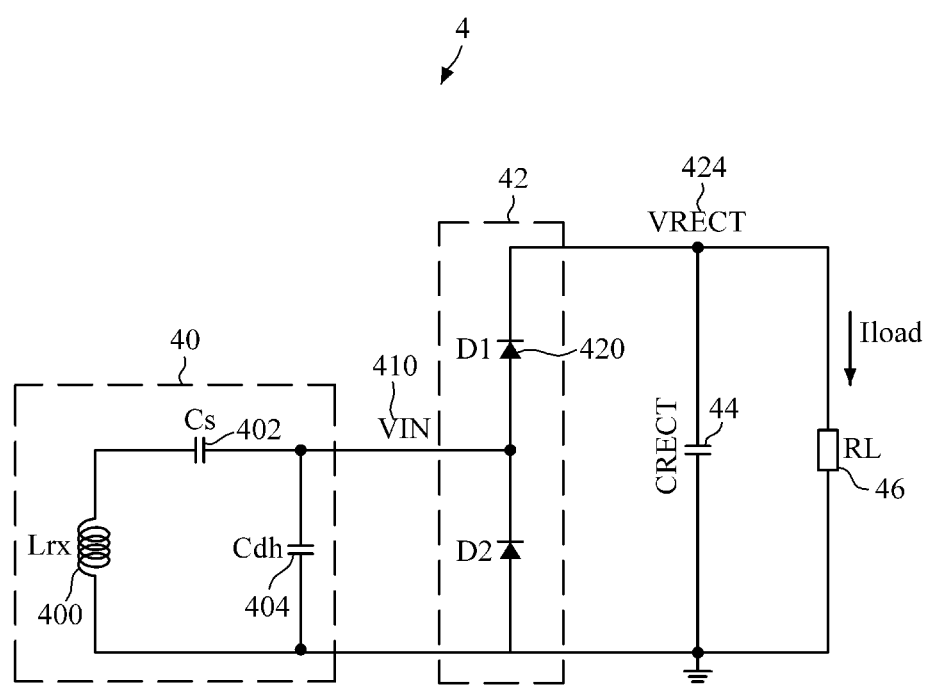
FIG. 4 is a circuit diagram of a PRU increasing a resonance frequency of a resonator using a second capacitor Cdh.

FIG. 4 is a circuit diagram of a PRU increasing a resonance frequency of a resonator using a second capacitor Cdh.

In the PRU that has been described with reference to FIG. 3, a voltage VRECT excessively increases when power consumed by a load is small and power supplied by a resonator is larger than the consumed power. In order to decrease the voltage VRECT, the power supplied by the resonator should be decreased. Thus, a resonance frequency thereof is changed. For example, as shown in FIG. 4, the resonance frequency is increased through a PRU 4 having a second capacitor Cdh 404 added thereto. Since the second capacitor Cdh 404 is additionally included, the resonance frequency is expressed as shown in Equation 2 when only a resonator 40 is seen.

$$frh = \frac{1}{2\pi\sqrt{Lrx\frac{CsCdh}{Cs+Cdh}}} > fr. \qquad \text{[Equation 2]}$$

Referring to Equation 2, a reference frequency frh is higher than the resonance frequency fr, which is a reference frequency when resonance occurs via an inductor Lrx 400 and a first capacitor Cs 402. Accordingly, electric current of the resonator 40 decreases, and thus the power supplied to the load may decrease. However, such a phenomenon occurs only when a resonant current flows through the first capacitor Cs 402 and the second capacitor Cdh 404. As described above with reference to FIG. 2, the voltage of the capacitor does not decrease rapidly as the resonance frequency increases. Accordingly, the electric current of the resonator 40 decreases, but a rectifier input voltage VIN 410 does not decrease significantly. Thus, when the rectifier input voltage VIN 410 is greater than a rectifier output voltage VRECT 424 (VIN>VRECT), a diode D1 420 of a rectifier 42 is turned on to enable the electric current of the resonator 40 to flow through a rectifier capacitor CRECT 44 and a load 46. The rectifier capacitor CRECT 44 is a capacitor for smoothing an AC voltage and has a much larger value than the first capacitor Cs 402 and the second capacitor Cdh 404. Also, the rectifier capacitor CRECT 44 is connected in parallel to the second capacitor Cdh 404 while the rectifier 42 operates. Thus, the resonance frequency is approximately the same as that shown in Equation 1. Accordingly, when VIN>VRECT, it is impossible to decrease the electric current of the resonator 40, and thus it is difficult to decrease the power supplied by the resonator 40.

Figure 5:
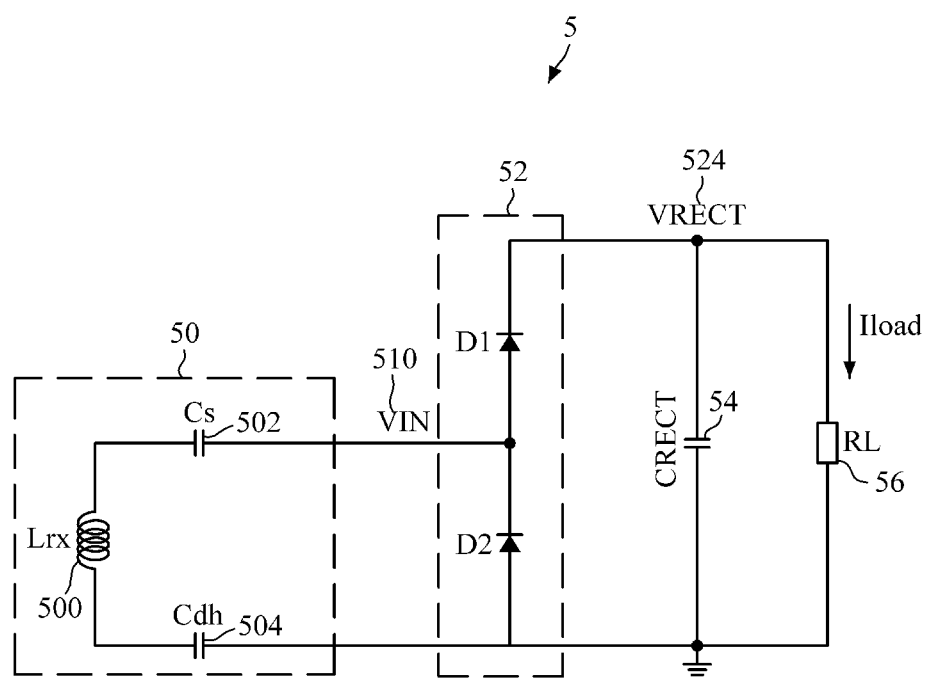
FIG. 5 is a circuit diagram of a PRU having a second capacitor Cdh connected in series to a rectifier capacitor CRECT.

FIG. 5 is a circuit diagram of a PRU having a second capacitor Cdh connected in series to a rectifier capacitor CRECT.

Referring to FIG. 5, a PRU 5 has a second capacitor Cdh 504 and a rectifier capacitor CRECT 54 connected in series. Accordingly, when a rectifier input voltage VIN 504 increases over a rectifier output voltage VRECT 524 (VIN>VRECT) to operate a rectifier 52, the second capacitor Cdh 504 is connected in series to the rectifier capacitor CRECT 54. Since CRECT>>Cdh, the resonator 50 is equivalent to a circuit in which an inductor Lrx 500, a first capacitor Cs 502, and the second capacitor Cdh 504 are connected in series, and thus a resonance frequency of the resonator 50 is approximately the same as that shown in Equation 2. Accordingly, since the resonance frequency of the resonator 50 increases while energy is transferred to a load 56, it is possible to decrease an electric current of the resonator 50 and also to decrease power transferred as an output thereof.

Figure 6:
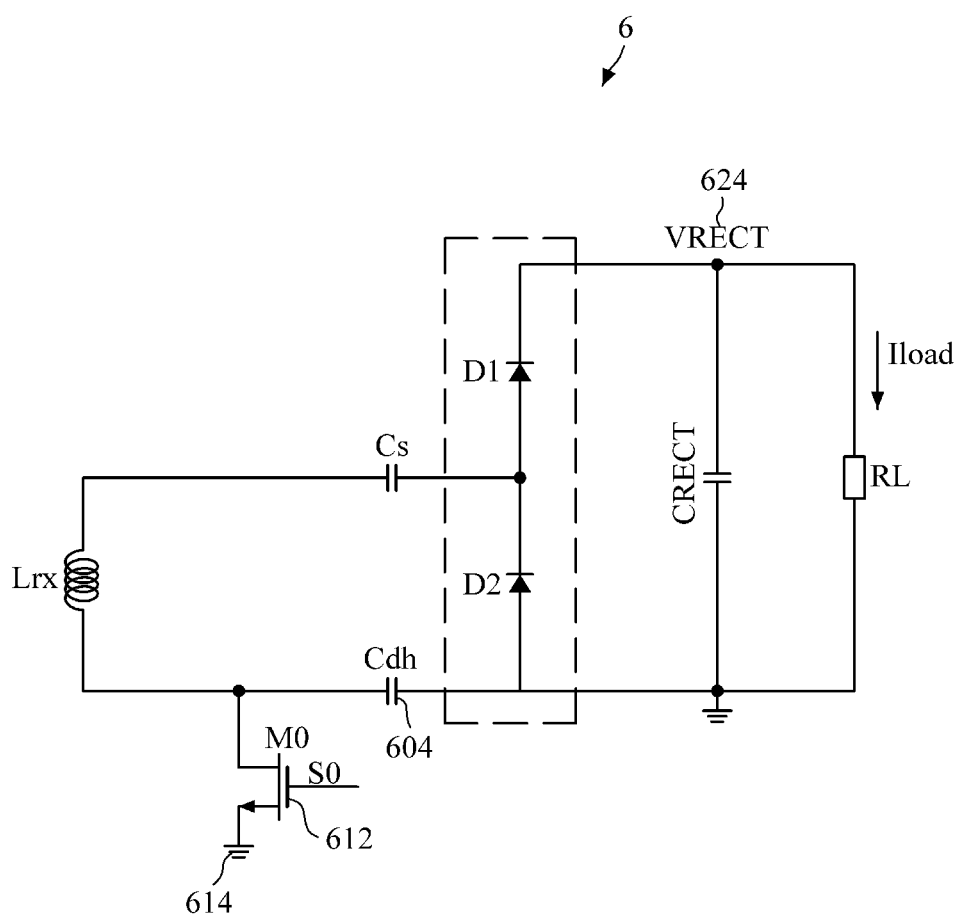
FIG. 6 is a circuit diagram of a PRU changing output power thereof by using a first switch M0 to change a resonance frequency.

FIG. 6 is a circuit diagram of a PRU changing output power by using a first switch M0 to change a resonance frequency.

Referring to FIG. 6, a PRU 6 adjusts a rectifier output voltage VRECT 624 by using a first switch M0 612 to change a resonance frequency. The first switch M0 612, which is implemented with a metal-oxide-semiconductor field-effect transistor (MOSFET), may be turned on by connecting the first switch M0 612 between a second capacitor Cdh 604 and a ground 614 and applying a control voltage S0, which is greater than or equal to a threshold voltage, to the first switch M0 612. When the first switch M0 612 is turned on, the second capacitor Cdh 604 is short-circuited. Accordingly, the resonance frequency is the same as that shown in Equation 1, and thus much energy is supplied from the resonator. As a result, it is possible to effectively increase the rectifier output voltage VRECT 624. On the other hand, when the first switch M0 612 is turned off, the second capacitor Cdh 604 increases the resonance frequency, and thus the electric current of the resonator is small. As a result, it is possible to effectively decrease the rectifier output voltage VRECT 624. Accordingly, it is possible to control the rectifier output voltage VRECT 624 by applying the control voltage S0 to the first switch M0 612.

Figure 7:
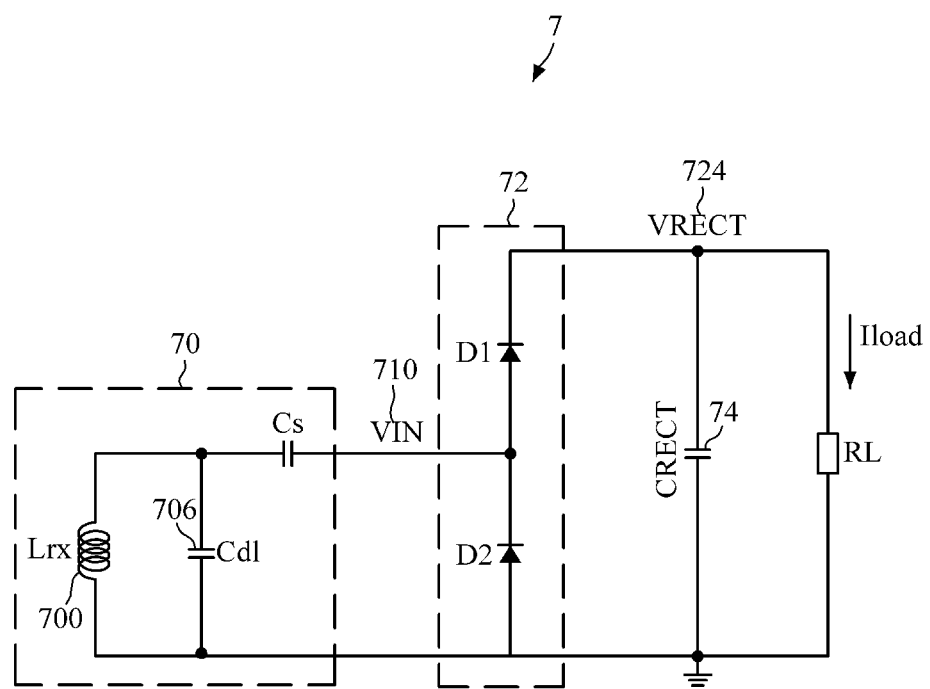
FIG. 7 is a circuit diagram of a PRU that decreases a resonance frequency of a resonator by using a third capacitor Cdl.

FIG. 7 is a circuit diagram of a PRU that decreases a resonance frequency of a resonator using a third capacitor Cdl.

When power required by a load decreases significantly, resonator power may not be controlled when only a second capacitor Cdh is additionally included as described above with reference to FIG. 6. In this case, the rectifier output voltage VRECT increases, and thus power is unnecessarily supplied to a load. Accordingly, the rectifier output voltage VRECT may increase over a breakdown voltage of the rectifier.

In order to prevent the situation, a method of lowering the resonance frequency is used to protect a resonator 70 and also maintain a rectifier output voltage VRECT 724. This method is effective because it is possible to slowly decrease an electric current of the resonator 70 and also rapidly decrease a voltage of the resonator 70 by decreasing a frequency of the resonator 70. To this end, a PRU 7 including a third capacitor Cdl 706 is implemented as shown in FIG. 7. When capacitance of the third capacitor Cdl 706 is set to be high enough to lower the resonance frequency, the resonance frequency and an inductor voltage decrease, and also a rectifier input voltage VIN 710 decreases below the rectifier output voltage VRECT 724. In this case, a rectifier 72 does not operate. Accordingly, a resonance frequency frl is determined by an inductor Lrx 700 and the third capacitor Cdl 706 and may be expressed as shown in Equation 3.

$$frl = \frac{1}{2\pi\sqrt{LrxCdl}} < fr. \qquad \text{[Equation 3]}$$

Figure 8:
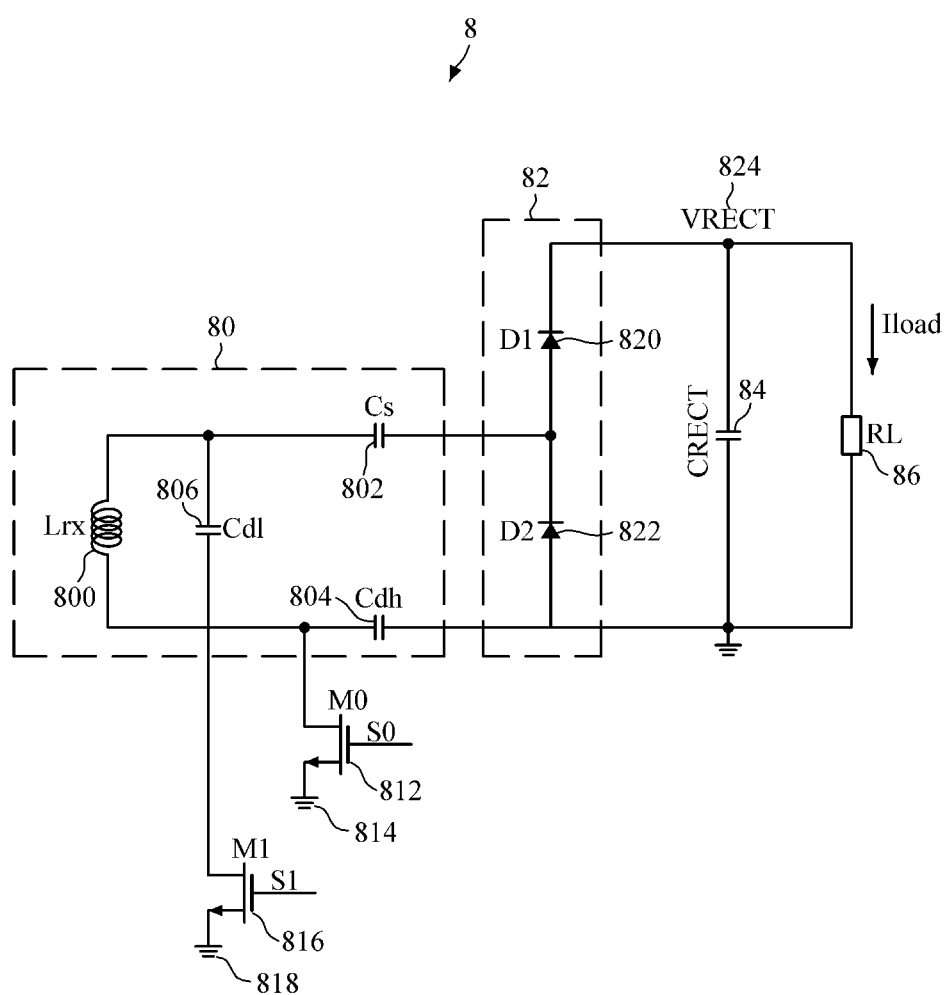
FIG. 8 is a circuit diagram of a PRU controlling a resonance frequency by using a first switch M0 and a second switch M1 according to an embodiment of the present invention.

FIG. 8 is a circuit diagram of a PRU controlling a resonance frequency by using a first switch M0 and a second switch M1 according to an embodiment of the present invention.

Referring to FIG. 8, a circuit of a PRU 8 is configured such that the effects described with reference to FIG. 7 may be applied to the circuit described with reference to FIG. 6. The circuit described with reference to FIG. 7 is obtained by turning on a second switch M1 816 while a first switch M0 812 is turned on. It is possible to freely control a rectifier output voltage VRECT 824 by using the circuit of the PRU 8 of FIG. 8.

The circuit of the PRU 8 according to an embodiment will be described below. The PRU 8 includes a resonator 80, a rectifier 82, a rectifier capacitor CRECT 84, a load 86, a first switch M0 812, and a second switch M1 816. The resonator 80 forms a resonance tank in which a second capacitor Cdh 804 and a third capacitor Cdl 805 are added to an inductor Lrx 800 and a first capacitor Cs 802 connected in series. The second capacitor Cdh 804 is connected in series to the inductor Lrx 800, the first capacitor Cs 802, and the rectifier capacitor CRECT 84 to increase a resonance frequency of the resonator 80. The third capacitor Cdl 806 is connected in parallel to the inductor Lrx 800, the first capacitor Cs 802, and the rectifier capacitor CRECT 84 to decrease the resonance frequency of the resonator 80. The rectifier 82 is connected to an output of the resonator 80. The rectifier 82 includes at least one diode, for example, diodes D1 820 and D2 822. The rectifier capacitor CRECT 84 smoothes an output voltage of the rectifier 82. The first switch M0 812 has a source connected to a first ground 814, a drain connected to the second capacitor Cdh 804, and a gate to which a first control voltage S0 is input. The first switch M0 812 is turned on when the first control voltage S0 is greater than or equal to a predetermined threshold value, and is turned off when the first control voltage S0 is less than or equal to a predetermined threshold value. The second switch M1 816 has a source connected to a second ground 818, a drain connected to the third capacitor Cdl 806, and a gate to which a second control voltage S1 is input. The second switch M1 816 is turned on when the second control voltage S1 is greater than or equal to a predetermined threshold value and is turned off when the second control voltage S1 is less than or equal to a predetermined threshold value.

A resonance frequency control method of the PRU 8 having the above-described circuit configuration may be classified into the following three steps.

(1) A case in which the rectifier output voltage VRECT 824 should be increased: set S0=high and S1=low to turn on the first switch M0 812 and turn off the second switch M1 816. In this case, since the resonance frequency is the same as that shown in Equation 1, the resonator 80 operates optimally such that much power may be supplied to the load 86.

(2) A case in which the rectifier output voltage VRECT 824 should be decreased: set S0=low and S1=low to turn off both of the switches 812 and 816. In this case, since the resonance frequency increases as shown in Equation 2, the electric current supplied from the resonator 80 may decrease, and thus the rectifier output voltage VRECT 824 may be decreased.

(3) A case in which the rectifier output voltage VRECT 824 is high during case 2: set S0=high and S1=high to turn on both of the switches 812 and 816. In this case, since the resonance frequency decreases as shown in Equation 3, an inductor voltage of the resonator 80 may decrease such that the rectifier 82 does not operate. Accordingly, power is not supplied to the load 86, and thus the rectifier output voltage VRECT 824 decreases.

Other than the above three steps, an intermediate process of setting S0=low and S1=high may be between step (2) and step (3). In this process, both of the second capacitor Cdh 804 and the third capacitor Cdl 806 affect the resonance frequency. Thus, it is possible to slightly decrease the inductor voltage while decreasing the electric current of the resonator 80. If necessary, the process may be used between steps (2) and (3).

Figure 9:
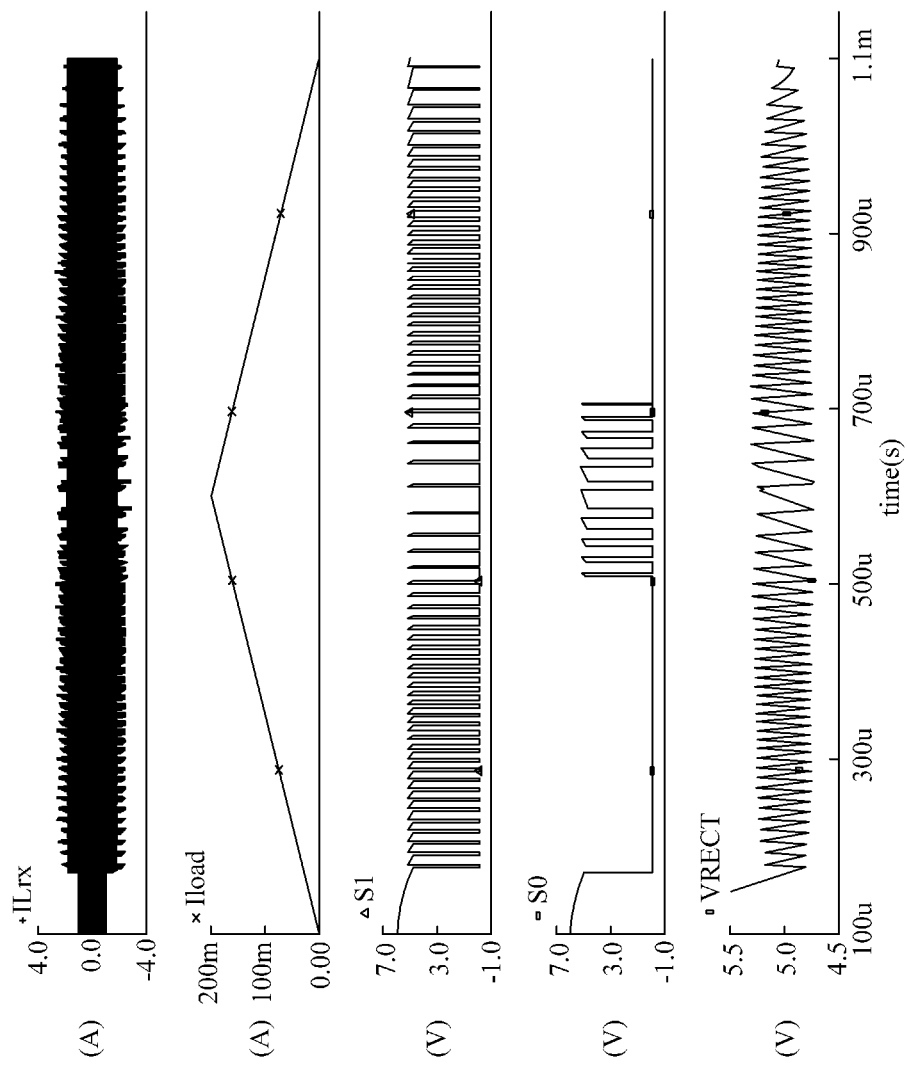
FIG. 9 is a circuit diagram of a PRU having a first rectifier and a second rectifier according to another embodiment of the present invention.

FIG. 9 is a circuit diagram of a PRU having a first rectifier and a second rectifier according to another embodiment of the present invention.

Referring to FIG. 9, the present invention may be applied to a full-wave rectifier circuit by connecting two outputs of a resonator 90 to inputs of half-wave rectifiers 92-1 and 92-2. When high output power is required, a circuit of a PRU may be configured as shown in FIG. 9. The circuit of the PRU is similar to the PRU 8 described with reference to FIG. 8 except for the two outputs of the resonator 90 being connected to the inputs of the half-wave rectifiers 92-1 and 92-2, and thus a detailed description thereof will be omitted.

Diodes described with reference to FIGS. 8 and 9 may be implemented as active diodes implemented with active elements such as MOSFETs.

As described above, it is possible to directly control a rectifier output voltage VRECT by using a typical rectifier, resonator, and switch to adjust a resonance frequency to be high or low. This method does not need a separate power converter for converting the rectifier output voltage VRECT into a voltage appropriate for a load, and may simply and efficiently implement a wireless power transmission system.

Figure 10:
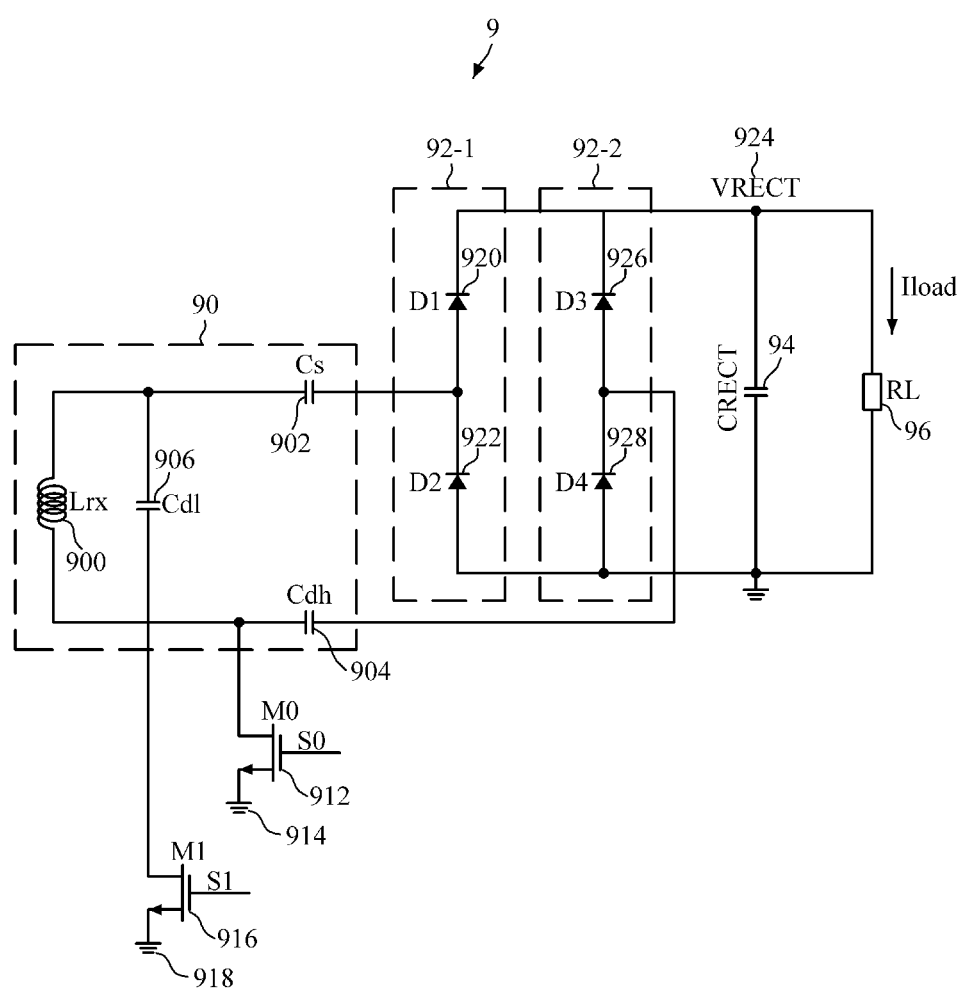
FIG. 10 is a waveform chart showing a waveform controlling a rectifier output voltage VRECT by controlling switches M0 and M1.

FIG. 10 is a waveform chart showing a waveform controlling a rectifier output voltage VRECT by controlling switches M0 and M1.

Waveforms indicate an inductor LrX current, a load current, a first control voltage S0, a second control voltage S1, and a rectifier output voltage VRECT in sequence from the top in FIG. 10.

Referring to FIG. 10, the rectifier output voltage VRECT is controlled to be a predetermined voltage, for example, about 5V, by being connected to a current source instead of the load described with reference to FIG. 8 and changing the current source from 0 mA to 200 mA, as shown in FIG. 10, to apply the control voltages S0 and S1 of switches M0 and M1. A signal generator of the control voltages S0 and S1 for automatically controlling the rectifier output voltage VRECT falls outside the scope of the present invention, and thus a detailed description thereof will be omitted.

Figure 11:
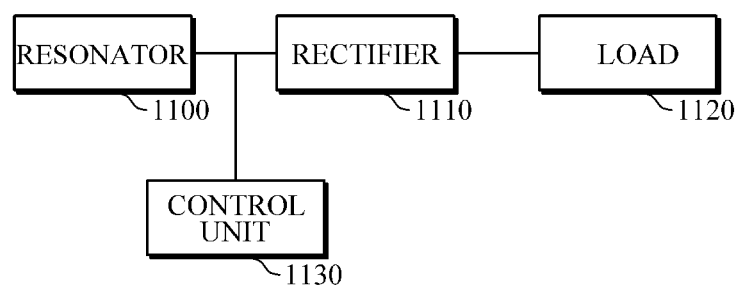
FIG. 11 is a block diagram of a PRU according to an embodiment of the present invention.

FIG. 11 is a block diagram of a PRU according to an embodiment of the present invention.

Referring to FIG. 11, the PRU includes a resonator 1100, a rectifier 1110, a load 1120, and a control unit 1130.

The resonator 1100 receives a wireless power signal from a PTU. The rectifier 1110 converts AC power received from the resonator 1100 into DC power and provides output power to the load 1120. The control unit 1130 adjusts a resonance frequency of the resonator 1100 to directly control the output power of the rectifier 1110 provided to the load 1120.

The resonator 1100 according to an embodiment includes an inductor Lrx, a first capacitor Cs, and a second capacitor Cdh connected to the inductor Lrx and the first capacitor Cs and configured to increase the resonance frequency of the resonator 1100. The control unit 1130 includes a first switch M0 connected between the second capacitor Cdh of the resonator 1100 and a ground and configured to control a rectifier output power VRECT by using the first control voltage S0. In this case, the second capacitor Cdh is connected in series to the first capacitor Cs and the inductor Lrx of the resonator 1100 as well as a rectifier capacitor CRECT to increase the resonance frequency of the resonator 1100. The control unit 1130 applies a predetermined threshold value or greater as the first control voltage S0 to turn on the first switch M0 and increase the rectifier output power VRECT or applies a predetermined threshold value or less as the first control voltage S0 to turn off the first switch M0 and decrease the rectifier output power VRECT.

The resonator 1100 according to an embodiment includes the inductor Lrx, the first capacitor Cs, and a third capacitor Cdl connected in parallel to the inductor Lrx, the first capacitor Cs, and the rectifier capacitor CRECT to decrease the resonance frequency of the resonator 1100. In this case, the control unit 1130 includes a second switch M1 connected between the third capacitor Cdl of the resonator 1100 and the ground and configured to control the rectifier output power VRECT by using the second control voltage S1.

The resonator 1100 according to an embodiment includes the inductor Lrx, the first capacitor Cs, the second capacitor Cdh connected in series to the inductor Lrx, the first capacitor Cs, and the rectifier capacitor CRECT to increase the resonance frequency of the resonator 1100, and the third capacitor Cdl connected in parallel to the inductor Lrx, the first capacitor Cs, and the rectifier capacitor CRECT to decrease the resonance frequency of the resonator 1100. The control unit 1130 includes the first switch M0 connected between the second capacitor Cdh of the resonator 1100 and the ground and configured to control the rectifier output power VRECT by using the first control voltage S0, and the second switch M1 connected between the third capacitor Cdl of the resonator 1100 and the ground and configured to control the rectifier output power VRECT by using the second control voltage 51.

The control unit 1130 according to an embodiment turns on the first switch M0 by using the first control voltage S0 and turns off the second switch M1 by using the second control voltage S1 to increase the output power of the rectifier 1110, or turns off the first switch M0 by using the first control voltage S0 and turns off the second switch M1 by using the second control voltage S1 to increase the resonance frequency and decrease the rectifier output power VRECT. When the output power is high even though the first switch M0 and the second switch M1 are turned off to decrease the rectifier output power VRECT, the control unit 1130 according to an embodiment turns on the first switch M0 by using the first control voltage S0 and turns on the second switch M1 by using the second control voltage S1 to decrease the resonance frequency to further decrease the output power VRECT.

The rectifier 1110 according to an embodiment includes a first rectifier configured to receive a first output signal of the first resonator 1100, and a second rectifier configured to receive a second output signal of the first resonator 1100.

So far, the present invention has been described with reference to embodiments thereof. It should be understood by those skilled in the art that various changes in form and details may be made therein without departing from the spirit and scope of the present invention. Therefore, the disclosed embodiments should be considered in a descriptive sense only and not for purposes of limitation. Also, the scope of the presents invention is defined not by the detailed description of embodiments but by the appended claims, and all differences within the scope thereof should be construed as being included in the present invention.

The invention claimed is:

1. A wireless power receiving unit (PRU) comprising:
   a resonator configured to receive wireless power;
   a rectifier configured to convert alternating current (AC) power received from the resonator into direct current (DC) power and provide output power to a load; and
   a control unit configured to adjust a resonance frequency of the resonator to directly control the output power of the rectifier provided to the load,
   wherein the resonator comprises an inductor, a first capacitor, and a second capacitor connected to the inductor and the first capacitor to increase the resonance frequency of the resonator,
   wherein the control unit comprises a first switch connected to the second capacitor of the resonator and a around and configured to control the output power of the rectifier by using a first control voltage, and
   wherein the second capacitor is connected in series to the first capacitor and the inductor of the resonator and a rectifier capacitor to increase the resonance frequency of the resonator.

2. The wireless PRU of claim 1, wherein the control unit applies a predetermined threshold value or greater as the first control voltage to turn on the first switch and increase the output power of the rectifier, or applies a predetermined threshold value or less as the first control voltage to turn off the first switch and decrease the output power of the rectifier.

3. The wireless PRU of claim 1, wherein the rectifier comprises:
   a first rectifier configured to receive a first output signal of the resonator; and
   a second rectifier configured to receive a second output signal of the resonator.

4. A wireless power receiving unit (PRU), comprising:
   a resonator configured to receive wireless power;
   a rectifier configured to convert alternating current (AC) power received from the resonator into direct current (DC) power and provide output power to a load; and
   a control unit configured to adjust a resonance frequency of the resonator to directly control the output power of the rectifier provided to the load,
   wherein the resonator comprises an inductor, a first capacitor, and a third capacitor connected in parallel to the inductor, the first capacitor, and a rectifier capacitor to decrease the resonance frequency of the resonator.

5. The wireless PRU of claim 4, wherein the control unit comprises a second switch connected between the third capacitor of the resonator and a ground and configured to control the output power of the rectifier by using a second control voltage.

6. A wireless power receiving unit (PRU) comprising:
   a resonator configured to receive wireless power;
   a rectifier configured to convert alternating current (AC) power received from the resonator into direct current (DC) power and provide output power to a load; and
   a control unit configured to adjust a resonance frequency of the resonator to directly control the output power of the rectifier provided to the load,
   wherein:
   the resonator comprises an inductor, a first capacitor, a second capacitor connected in series to the inductor, the first capacitor, and a rectifier capacitor to increase the resonance frequency of the resonator, and a third capacitor connected in parallel to the inductor, the first capacitor, and the rectifier capacitor to decrease the resonance frequency of the resonator; and the control unit comprises:

a first switch connected between the second capacitor of the resonator and a ground and configured to control the output power of the rectifier by using a first control voltage; and a second switch connected between the third capacitor of the resonator and the ground and configured to control the output power of the rectifier by using a second control voltage.

7. The wireless PRU of claim 6, wherein the control unit turns on the first switch by using the first control voltage and turns off the second switch by using the second control voltage to increase the output power of the rectifier, or turns off the first switch by using the first control voltage and turns off the second switch by using the second control voltage to increase the resonance frequency and decrease the output power of the rectifier.

8. The wireless PRU of claim 7, wherein when the output power of the rectifier is high even though the first switch and the second switch are turned off to decrease the output power, the control unit turns on the first switch by using the first control voltage and turns on the second switch by using the second control voltage to decrease the resonance frequency to further decrease the output power of the rectifier.

* * * * *